United States Patent
Lee

(10) Patent No.: US 10,205,280 B2
(45) Date of Patent: Feb. 12, 2019

(54) CONNECTOR AND ELECTRONIC DEVICE WITH THE CONNECTOR

(71) Applicant: NANNING FUGUI PRECISION INDUSTRIAL CO., LTD., Nanning (CN)

(72) Inventor: Chi-Jung Lee, New Taipei (TW)

(73) Assignee: NANNING FUGUI PRECISION INDUSTRIAL CO., LTD., Nanning (CN)

( * ) Notice: Subject to any disclaimer, the term of this patent is extended or adjusted under 35 U.S.C. 154(b) by 0 days.

(21) Appl. No.: 15/653,660

(22) Filed: Jul. 19, 2017

(65) Prior Publication Data

US 2018/0366876 A1 Dec. 20, 2018

(30) Foreign Application Priority Data

Jun. 15, 2017 (CN) .......................... 2017 1 0453997

(51) Int. Cl.

| H01R 13/641 | (2006.01) |
| H01R 13/635 | (2006.01) |
| H01R 12/70 | (2011.01) |
| H01R 13/518 | (2006.01) |
| H01R 13/717 | (2006.01) |
| H01R 13/04 | (2006.01) |

(Continued)

(52) U.S. Cl.
CPC ........... *H01R 13/635* (2013.01); *H01R 12/70* (2013.01); *H01R 13/04* (2013.01); *H01R 13/518* (2013.01); *H01R 13/641* (2013.01); *H01R 13/7175* (2013.01); *H01R 31/02* (2013.01); *H01R 13/621* (2013.01)

(58) Field of Classification Search
CPC .............. H01R 13/453; H01R 13/4532; H01R 13/4536; H01R 13/703; H01R 13/701; H01R 13/641
USPC .............. 439/188, 136–138, 490; 200/51.09, 200/51.11
See application file for complete search history.

(56) References Cited

U.S. PATENT DOCUMENTS

| 3,982,084 | A | * | 9/1976 | Cooperstein | ....... | H01R 13/7036 |
| | | | | | | 200/51.09 |
| 4,389,551 | A | * | 6/1983 | Deibele | .............. | H01R 13/7035 |
| | | | | | | 200/50.31 |

(Continued)

FOREIGN PATENT DOCUMENTS

| CN | 201717386 U | 1/2011 |
| EP | 1912125 B1 | 4/2008 |

(Continued)

*Primary Examiner* — Felix O Figueroa
(74) *Attorney, Agent, or Firm* — ScienBiziP, P.C.

(57) ABSTRACT

A connector includes a cavity, a detecting portion, and a door. The cavity includes a first interface, the detecting portion is set in the cavity, and the door is set at the first interface. A first door first end includes a metal portion, such that when an external device enters in the cavity through the first interface by pushing the door, the metal portion is coupled to the detecting portion, and the detecting portion outputs a first control signal accordingly. When an external device is inserted into the connector, a power is supplied to the connector, when the external device is not inserted into the connector, the power is not supplied to the connector, thus achieving the purpose of energy conservation.

20 Claims, 9 Drawing Sheets

(51) Int. Cl.
*H01R 31/02* (2006.01)
*H01R 13/621* (2006.01)

(56) References Cited

U.S. PATENT DOCUMENTS

| | | | | |
|---|---|---|---|---|
| 5,277,602 A * | 1/1994 | Yi | ...................... | H01R 13/7036 |
| | | | | 439/138 |
| 5,374,199 A * | 12/1994 | Chung | ............... | H01R 13/7036 |
| | | | | 200/51.09 |
| 6,827,596 B2 * | 12/2004 | Hori | ................... | H01R 13/6275 |
| | | | | 439/188 |
| 7,821,370 B1 * | 10/2010 | Shu | ...................... | G02B 6/4292 |
| | | | | 439/138 |

FOREIGN PATENT DOCUMENTS

| | | |
|---|---|---|
| TW | M403837 U | 5/2011 |
| TW | M408183 U | 7/2011 |
| TW | 201516643 A | 5/2015 |
| WO | 2011/130026 A3 | 10/2011 |

* cited by examiner

CONNECTOR AND ELECTRONIC DEVICE WITH THE CONNECTOR

FIELD

The disclosure generally relates to a connector and an electronic device, and especially relates to a power saving and energy conservation connector and an electronic device with the connector.

BACKGROUND

Sony Philips Digital interface Format (SPDIF) input, also called optical fiber input or Toslink, was developed by the Japanese company TOSHIBA and named after the Toshiba+ link. Connectors with technical standard of Toslink are widely used in digital audio and video equipments, such as CD, LD, MD, DVD, SET-TO-BOX and TV. Connectors with SPDIF interface are in plug and play field, but when an external device is not connected to the connectors with SPDIF interface, the connectors are also powered on at all times. A connector and electronic device with the connector should have better energy conserving characteristics.

BRIEF DESCRIPTION OF THE DRAWINGS

Embodiments of the present technology will now be described, by way of example only, with reference to the attached figures, wherein.

DETAILED DESCRIPTION

Figure 1:
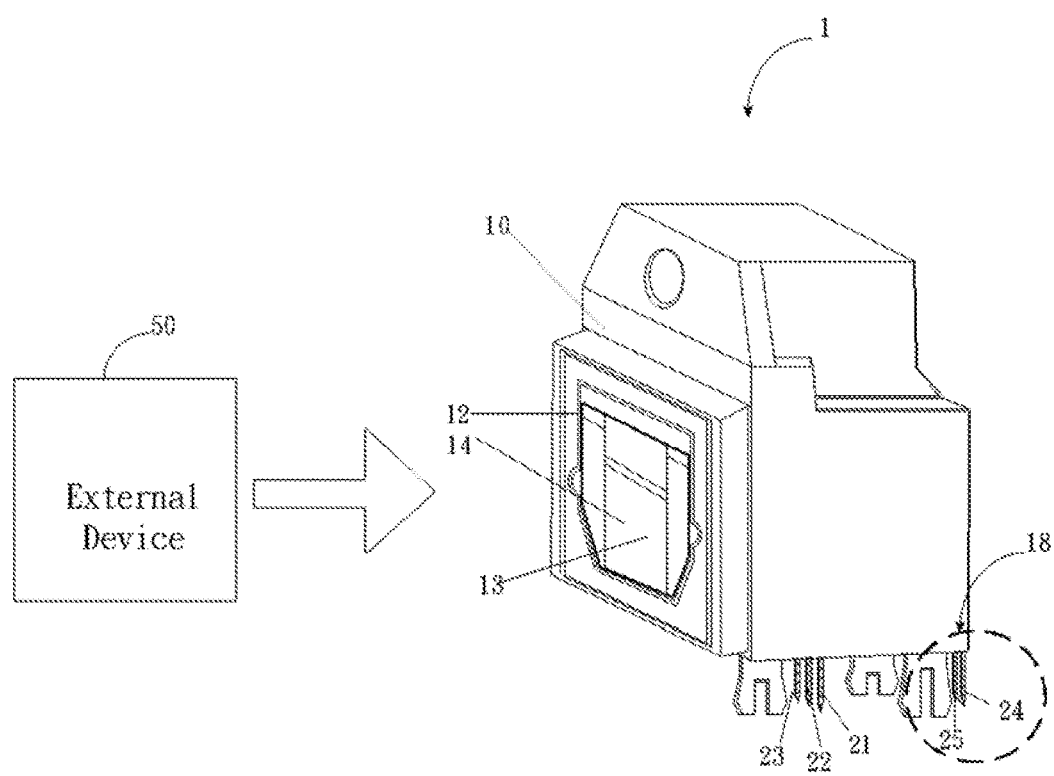
FIG. 1 is a diagram of a connector according to an embodiment of the disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in, the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

FIG. 1 illustrates a connector 1 according to an embodiment of the disclosure.

In the embodiment, the connector 1 is set in an electronic device, and configured to electrically connect with an external device 50. The connector 1 comprises a cavity 13 (best seen in FIG. 2), a door 14 and a shell 10. The cavity 13 comprises an interface 12, and the door 14 is set at the interface 12. The external device 50 has a plug (not shown) that enters into the cavity 13 through the interface 12, pushing against and opening the door 14. The connector 1 further comprises a breakover pin 21, a powering pin 22, a grounding pin 23, and a detecting portion 18. The detecting portion 18 comprises a first detecting pin 24 and a second detecting pin 25. The breakover pin 21, the powering pin 22, the grounding pin 23, the detecting portion 18, and the cavity 13 are set in the shell 10. In one embodiment, the door 14 and the shell 10 can be made of plastic.

Figure 2:
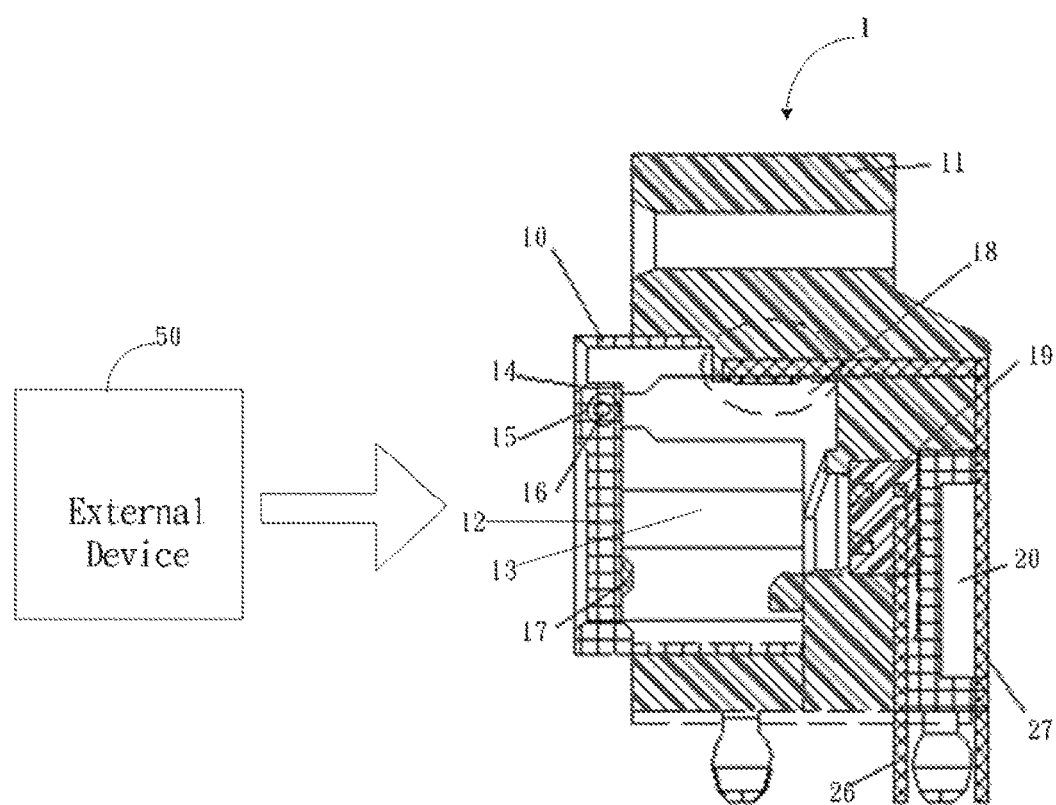
FIG. 2 is a side view of the connector of FIG. 1.
Figure 3:
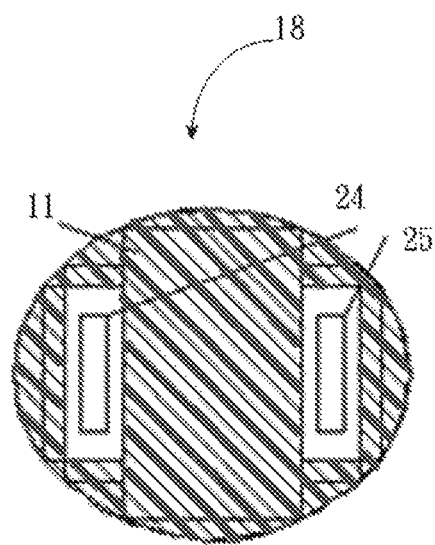
FIG. 3(A) and FIG. 3(B) are enlarged side view of the connector of FIG. 2.
Figure 3:
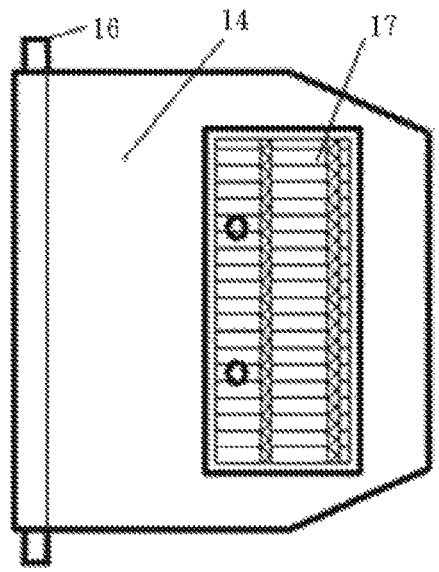

FIG. 2 is a side view of the connector of FIG. 1, and FIG. 3(A) and FIG. 3(B) show enlarged side view of the connector of FIG. 2.

In one embodiment, the shell 10 is set in a frame 11. The frame 11 is configured to receive the cavity 13, the door 14, the shell 10, the breakover pin 21, the powering pin 22, the grounding pin 23, and the detecting portion 18. As shown in FIG. 3(B), the door 14 comprises a door first end and a door second end. The door first end is coupled to the frame 11 by a shaft 16, and the door 14 can rotate around the shaft 16. A spring 15 is set at the joint of the door 14 and the shaft 16. When the external device 50 pushes the door 14, the spring 15 is stretched and consequently has an elastic force to return to an original state of covering the interface 12. When the external device 50 is removed, the door 14 can return to the original state by the elastic force. In other embodiment, the spring 15 can be removed or replaced by other elastic elements. The door second end comprises a metal portion 17. The metal portion 17 can be square-shape, and the metal portion 17 can be metal, such as copper, and the metal portion 17 can be square-shaped, rectangle-shaped, strip-shaped, and so on. When the door 14 is pushed into the cavity 13, the door 14 rotates around the shaft 16 until the door 14 second end contacts the detecting portion 18 set in the cavity 13 upper face. The external device 50 pushes the door 14 to enter into the cavity 13 through the interface 12. The detecting portion 18 is configured to detect if the external device 50 is electrically connected to the connector 1 as described below.

As shown in FIG. 3(A), in one embodiment, the detecting portion 18 comprises a first detecting pin 24 and a second detecting pin 25. The detecting portion 18 is electrically connected to a detecting line 27. When the detecting portion 18 detected that the external device 50 is electrically connected to the connector 1, a power module of the electronic device supplies power to the connector 1. When the external device 50 enters the cavity 13 by pushing the door 14 through the interface 12, the metal portion 17 makes contact with the first detecting pin 24 and the second detecting pin 25, resulting in the first detecting pin 24 and the second detecting pin 25 being electrically connected. When the first detecting pin 24 and the second detecting pin 25 are electrically connected, the detecting portion 18 outputs a first control signal. The connector 1 further comprises a series of signal pins to communicate with the external device 50 (not shown in diagram).

As shown in FIG. 2, in one embodiment, the connector 1 further comprises an LED shell 19. The LED shell 19 can be transparent, and the LED shell is configured to contain at least one LED (one LED is shown as a non-limiting example) and LED driving device (not shown in FIG. 2). The LED is configured to indicate whether the external device 50 is connected to the connector or not; for example, when the external device 50 is electrically connected to the connector 1, the LED lights up.

In one embodiment, the connector 1 further comprises a first space 20, the first space 20 is configured to save material.

In one embodiment, the materials making up the shell 19, the frame 11, and the door 14 can be plastic.

Figure 4:
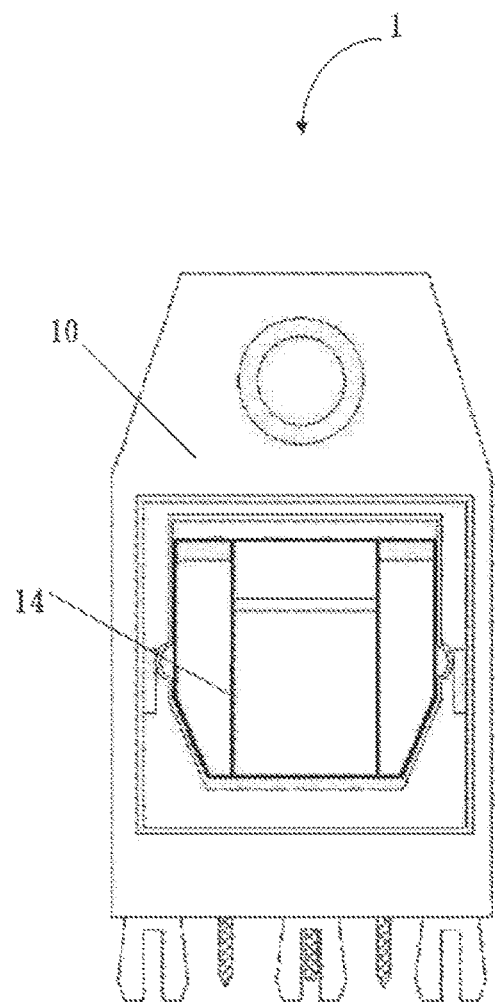
FIG. 4 is a front view of the connector of FIG. 1.

FIG. 4 is a front view of the connector of FIG. 1. As shown in FIG. 4, the connector 1 comprises the shell 10 and the door 14.

Figure 5:
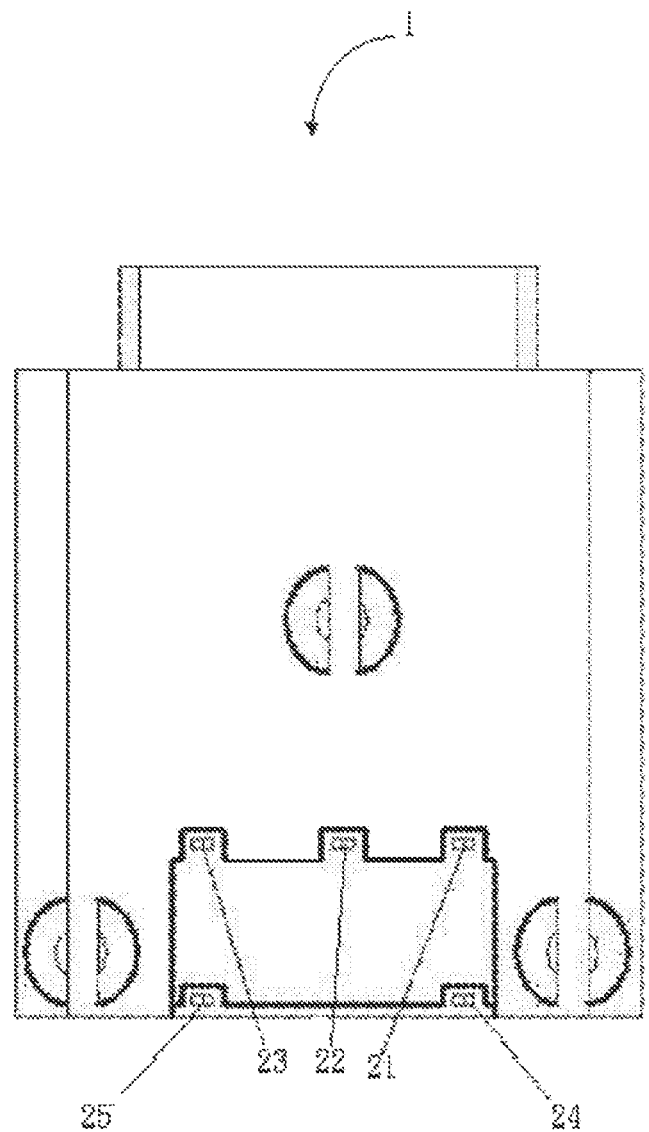
FIG. 5 is an view from below of the connector of FIG. 1.

FIG. 5 is view of the connector of FIG. 1 from below. As shown in FIG. 5 the connector 1 comprises the breakover pin 21, the powering pin 22, the grounding pin 23, the first detecting pin 24, and the second detecting pin 25.

Figure 6:
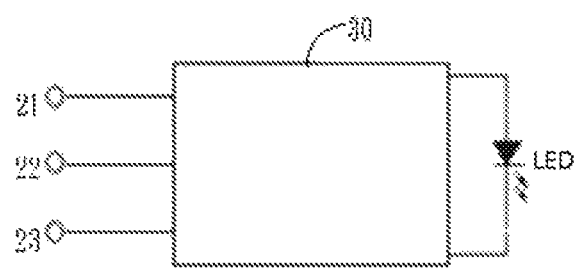
FIG. 6(A) and FIG. 6(B) are pin connection diagram of the connector of FIG. 5.
Figure 6:
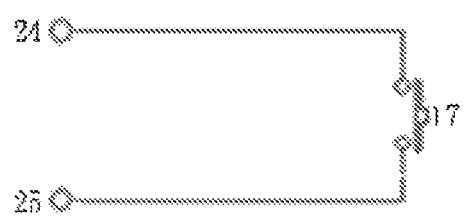

FIG. 6 is a pin connection diagram of the connector of FIG. 5, seen from below.

As shown in FIG. 6(A), in one embodiment, the LED driving device can be a driving module 30, the LED is driven by the driving module 30. The driving module 30 is electrically connected to the breakover pin 21, the powering pin 22, and the grounding pin 23. The driving module 30 comprises logic control circuit and a LED driving circuit, the driving module 30 is further configured to shape and amplify signals.

As shown in FIG. 6(B), in one embodiment, the first detecting pin 24 and the second detecting pin 25 are electrically connected by the metal portion 17.

Figure 7:
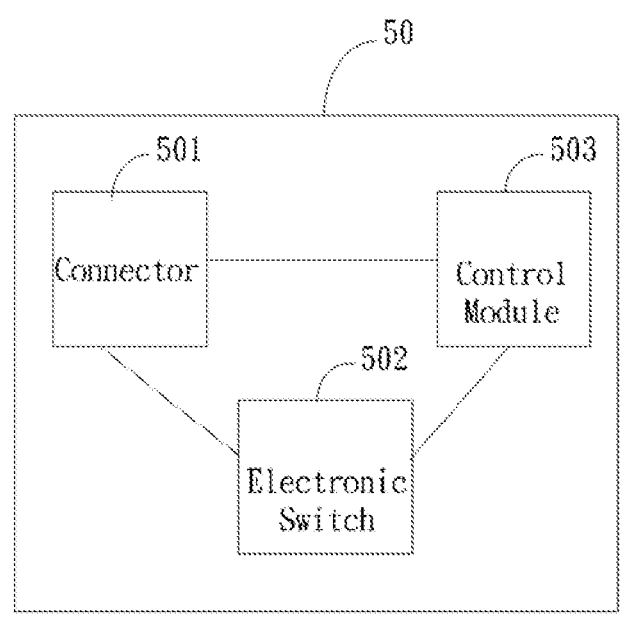
FIG. 7 is a module diagram of an electronic device according to an embodiment of the disclosure.

FIG. 7 is a module diagram of an electronic device 40 according to an embodiment of the disclosure.

As shown in FIG. 7, in one embodiment, the electronic device 40 comprises a connector 410, an electronic switch 420, and a control module 430. The connector 410, the electronic switch 420, and the control module 430 are electrically connected with each other.

In one embodiment, the connector 410 can be the connector 1 illustrated above.

Figure 8:
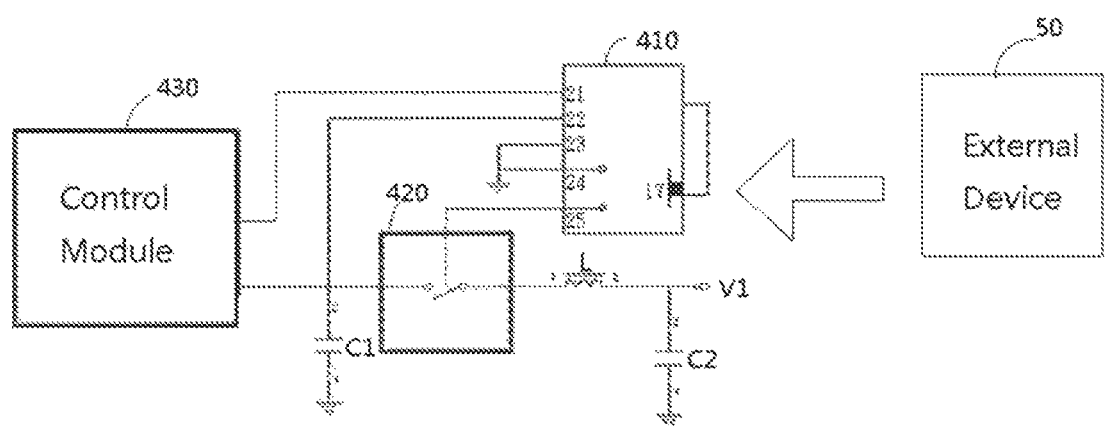
FIG. 8 is a circuit structure of the electronic device of FIG. 7.

FIG. 8 is a circuit structure of the electronic device of FIG. 7.

As shown in FIG. 8, in one embodiment, the connector 410 can be the connector 1 in FIG. 1, the connector 410 comprises the breakover pin 21, the powering pin 22, the grounding pin 23, the first detecting pin 24, and the second detecting pin 25. The breakover pin 21 is electrically connected to a sending end of the control module 430, and the grounding pin 23 and the first detecting pin 24 are grounded. The electronic switch 420 comprises an electronic switch 420 first end, an electronic switch 420 second end and an electronic switch 420 control end. The electronic switch 420 control end is electrically connected to the second detecting pin 25, the electronic switch 420 first end is electrically connected to a first inductor L, and the electronic switch 420 second end is electrically connected to the powering pin 22 and the control module 430. The powering pin 22 is grounded through a first capacitor C1. The first inductor L is runner electrically connected to a first power V1 and a second capacitor C2, and the second capacitor C2 is grounded. The first inductor L and the second capacitor C2 are configured to filter electromagnetic interference (EMI) of the first power V1, and the first capacitor C1 is configured to filter power input to the connector 410 and the control module 430.

In one embodiment, the first inductor L can be inductor with magnetic core or iron core. The first power V1 can be power outputted by the electronic device 40, for example, the first power V1 can be 5V power. The electronic switch 420 can be triode, Metal Oxide Semiconductor, or a relay.

As shown in FIG. 8, in one embodiment, the electronic device 40 comprises an SPDIF interface, the electronic switch 420 detects whether or not the external device 50 is connected with the SPDIF interface. When the external device 50 is inserted into the connector 420, the metal portion 17 contacts the first detecting pin 24 and the second detecting pin 25, and the first detecting pin 24 and the second detecting pin 25 are electrically connected by the metal portion 17. Then a first control signal is outputted by the detecting portion 18 to the electronic switch 420 control end. The electronic switch 420 is enabled according to the first control signal. The first power V1 supplies power to the powering pin 22 and the control module 430 after the EMI and noise are filtered. The control module 430 sends a driving signal to the driving module 30 through the breakover pin 21 to light up the LED when the control module 430 detects that the connector 410 is powered on. The control module 430 sends information to the external device 50. In one embodiment. The information comprises video information and audio information. If the external device 50 is not connected to the connector 410, the first detecting pin 24 and the second detecting pin 25 are isolated, and the electronic switch 420 is not enabled, thus the first power V1 will not supply power to the connector 410. When the external device 50 is not inserted into the connector 410, the connector 410 does not consume power to achieve the purpose of energy conservation.

Figure 9:
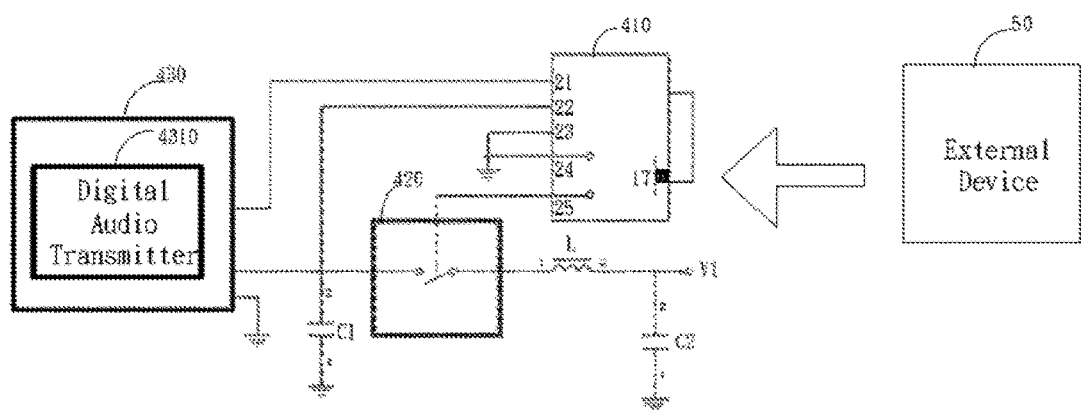
FIG. 9 is another circuit structure of the electronic device of FIG. 7.

FIG. 9 is another circuit structure of the electronic device of FIG. 7.

As shown in FIG. 9, in one embodiment, the electronic device 40 does not have the SPDIF interface, for example, some set top box (STB) and over the top (OTT) do not have the ability to output SPDIF signals. The control module 430 comprises a digital audio transmitter 4310 to output the SPDIF signals. The electronic switch 420 second end is electrically connected to the digital audio transmitter 4310. The electronic switch 420 detects whether the external device 50 is connected with the connector 410 or not. When the external device 50 is inserted into the connector 420, the metal portion 17 makes contact with the first detecting pin 24 and the second detecting pin 25, and the first detecting pin 24 and the second detecting pin 25 are electrically connected by the metal portion 17. Then the first control signal is outputted by the detecting portion 18 to the electronic switch 420 control end. The electronic switch 420 is enabled according to the first control signal. The first power V1 supplies power to the powering pin 22 and the digital audio transmitter 4310 (after the EMI and noises are filtered out) to power on the connector 410 and the digital audio transmitter 4310. The control module 430 sends a driving signal to the driving module 30 through the breakover pin 21 to light up the LED when the control module 430 detects that the connector 410 is powered on. The control module 430 further sends reset information to the digital audio transmitter 4310 to reset and initialize the digital audio transmitter 4310. When then digital audio transmitter 4310 is initialized, the control module 430 sends information to the external device 50, by the digital audio transmitter 4310.

In one embodiment, the information comprises video information and audio information. If the external device 50 is not connected to the connector 410, the first detecting pin 24 and the second detecting pin 25 are isolated, thus the electronic switch 420 is not enabled, resulting in the first power V1 not supplying power to the connector 410 and the digital audio transmitter 4310. When the external device 50 is not inserted into the connector 410, the connector 410 does not consume power to achieve the purpose of energy conservation.

The foregoing description, for purposes of explanation, has been described with reference to specific embodiments. However, the illustrative discussion above are not intended to be exhaustive or to limit the disclosure to the precise forms disclosed. Many modifications and variations are possible in view of the above teachings. The various modifications from the principles of the disclosure are therefore included and protected within the scope of the claims.

What is claimed is:

1. A connector, comprising:
   a cavity comprising a first interface;
   a detecting portion, set in a sunken portion of the cavity; and
   a door, set at the first interface, comprising an active door first end having a metal portion, wherein, when an external device enters the cavity through the first interface by pushing the door, the metal portion is coupled to the detecting portion, and the detecting portion outputs a first control signal to control a power module of the external device to supply power to the connector;
   wherein the detecting portion comprises a first detecting pin and a second detecting pin, when the external device enters the cavity through the first interface by pushing the door, the metal portion contacts the first detecting pin and the second detecting pin, and the first detecting pin electrically connects with the second detecting pin through the metal portion, then the detecting portion outputs the first control signal.

2. The connector of claim 1, further comprising:
   a breakover pin, coupled to an electronic device control module;
   a powering pin, configured to couple to an electronic device power module when the metal portion contacts with the first detecting pin and the second detecting pin;
   a grounding pin, coupled to the first detecting pin, and the grounding pin is grounded; and
   a signal pin, configured to communicate with the external device.

3. The connector of the claim 2, wherein the door further comprises an door second end coupled to a frame by a shaft.

4. The connector of the claim 3, wherein a spring is set at the joint of the door and the shaft, when the external device pushes the door, the spring is stretched to have an elastic force to return to an original shape.

5. The connector of the claim 2, further comprising a LED, configured to indicate whether the first detecting pin and the second detecting pin are coupled, wherein when the first detecting pin and the second detecting pin are coupled, the LED lights on.

6. The connector of claim 5, further comprising a driving module, coupled to the LED, the breakover pin, the powering pin, and the grounding pin, wherein when the powering pin is powered on, the control module sends a driving signal to the driving module by the breakover pin to drive the LED on.

7. The connector of claim 6, further comprising a LED shell, configured to package the LED and the driving module, wherein the LED shell is transparent.

8. The connector of claim 1, further comprising a shell, configured to contain the cavity and the detecting portion.

9. The connector of claim 8, wherein the door and the shell is plastic.

10. An electronic device, comprising:
    a connector, comprising:
      a cavity comprising a first interface;
      a detecting portion, set in a sunken portion of the cavity;
      a door, set at the first interface, comprising a door first end having a metal portion, wherein, when an external device enters the cavity through the first interface by pushing the door, the metal portion is coupled to the detecting portion, and the detecting portion outputs a first control signal;
    an electronic switch, coupled to the connector; and
    a control module, coupled to the electronic switch and the connector, configured to send information to the external device by the connector when the external device is coupled to the connector.

11. The electronic device of claim 10, wherein, the detecting portion comprises:
    a first detecting pin and a second detecting pin, when the external device enters the cavity through the first interface by pushing the door, the metal portion contacts the first detecting pin and the second detecting pin, and the first detecting pin electrically connects with the second detecting pin through the metal portion, then the detecting portion outputs the first control signal.

12. The electronic device of claim 11, the connector further comprising:
    a breakover pin, coupled to an electronic device control module;
    a powering pin, configured to couple to an electronic device power module when the metal portion contacts with the first detecting pin and the second detecting pin;
    a grounding pin, coupled to the first detecting pin, and the grounding pin is grounded; and
    a signal pin, configured to communicate with the external device.

13. The electronic device of claim 12, wherein the door further comprises an door second end coupled to a frame by a shaft.

14. The electronic device of claim 13, wherein a spring is set at the joint of the door and the shaft, when the external device pushes the door, the spring is stretched to have an elastic force to return to an original shape.

15. The electronic device of claim 14, the connector further comprising a LED, configured to indicate whether the first detecting pin and the second detecting pin are coupled, wherein when the first detecting pin and the second detecting pin are coupled, the LED lights on.

16. The electronic device of claim 15, the connector further comprising a driving module, coupled to the LED, the breakover pin, the powering pin, and the grounding pin, wherein when the powering pin is powered on, the control module sends a driving signal to the driving module by the breakover pin to drive the LED on.

17. The electronic device of claim 16, wherein the electronic switch comprises an electronic switch first end, an electronic switch second end and an electronic switch control end;

the electronic switch first end is coupled to a first inductor;

the electronic switch second end is coupled to the powering pin;

the powering pin is grounded by a first capacitor;

the first inductor is further coupled to the first power and a second capacitor;

the second capacitor is grounded;

the electronic switch control end is coupled to the second detecting pin; and the electronic switch is enabled and a first power supplies power to the connector by the powering pin when the electronic switch receives the first control signal.

18. The electronic device of claim 17, wherein the first inductor comprises magnetic core.

19. The electronic device of claim 18, wherein the first power is from the electronic device and defined as 5V.

20. The electronic device of claim 19, wherein the information comprises the driving signal.

* * * * *